United States Patent [19]
Wass et al.

[11] Patent Number: 6,007,049
[45] Date of Patent: Dec. 28, 1999

[54] HIGH PRESSURE GAS VALVE HAVING AN INVERTED STEM/SEAT DESIGN AND A SOFT SEATED REMOVABLE STEM CARTRIDGE

[76] Inventors: Lloyd G. Wass, R.R.1, Pierz, Minn. 56364; Kurt L. Drewelow, Rte. 2, Aitken, Minn. 56431; Claes Granfelt, Box 2103, S-135 02, Tyreso, Sweden

[21] Appl. No.: 08/933,812

[22] Filed: Sep. 19, 1997

Related U.S. Application Data

[60] Provisional application No. 60/026,364, Sep. 19, 1996.

[51] Int. Cl.⁶ ..................................................... F16K 51/00
[52] U.S. Cl. ........................... 251/368; 251/144; 251/223; 251/357
[58] Field of Search ..................................... 251/368, 144, 251/274, 264, 358, 357, 223, 225; 222/3

[56] References Cited

U.S. PATENT DOCUMENTS

| | | | |
|---|---|---|---|
| 3,137,476 | 6/1964 | Rotheraine | 251/357 |
| 3,744,526 | 7/1973 | MacNiel | 137/599.2 |
| 3,933,337 | 1/1976 | Morris et al. | 251/54 |
| 4,525,910 | 7/1985 | Boehmer | 251/357 |
| 5,386,965 | 2/1995 | Marchal | 251/282 |
| 5,435,348 | 7/1995 | Nakamura et al. | 137/625.17 |

FOREIGN PATENT DOCUMENTS

| | | | |
|---|---|---|---|
| 1246931 | 10/1960 | France | 251/223 |

*Primary Examiner*—A. Michael Chambers
*Attorney, Agent, or Firm*—John M. Vasuta

[57] ABSTRACT

An improved shutoff valve has an inverted stem/seat design with a removable cartridge including a stem designed to include a high performance polymer tip for use with a compressed fluid cylinder. The high performance polymer tip reduces the likelihood of damage to the valve seating area of the shutoff valve. The removable cartridge with the high performance polymer tip thereon makes replacement quick and easy should the soft tip become damaged. The inverted stem/seat design positions the stem and high performance polymer tip such that the pressurized gas acts in unison with the threaded stem tip in seating the stem rather than acting against the stem.

34 Claims, 10 Drawing Sheets

HIGH PRESSURE GAS VALVE HAVING AN INVERTED STEM/SEAT DESIGN AND A SOFT SEATED REMOVABLE STEM CARTRIDGE

This application is related to provisional application No. 60/026,364 filed Sep. 19, 1996.

BACKGROUND OF THE INVENTION

1. Technical Field

The present invention relates to shutoff valves. More particularly, the present invention relates to shutoff valves for use with compressed fluid tanks, such as natural gas tanks or cylinders as used on vehicles. Specifically, the present invention relates to a shutoff valve having an inverted stem/seat design with a removable stem designed to include a high performance polymer tip for use with a compressed fluid cylinder where the high performance polymer tip reduces the likelihood of damage to the valve seating area of the shutoff valve, where the removable stem with the high performance polymer Up thereon makes replacement quick and easy should the soft tip become damaged, and where the inverted stem/seat design positions the stem and high performance polymer tip such that the pressurized natural gas acts in unison with the threaded stem tip in seating the stem rather than acting against the stem.

2. Background Information

Since the advent of automobiles and other vehicles at the beginning of the twentieth century, substantially all vehicles have been powered by internal combustion engines. However, it has long been known that natural gas is a cleaner burning fuel and that sufficient natural gas for long trips may be stored under pressure in a compressed state within a high-pressure gas storage cylinder. This coupled with the recent trend toward more environmentally friendly products, further coupled with increased gasoline prices since the 1970's as well as improved cost efficiency surrounding natural gas combustion, has resulted in natural gas combustion growing in popularity because it provides a cost efficient and environmentally friendly alternative to the gasoline engines presently wide spread.

As a result of the above mentioned factors, the use of compressed natural gas has begun to grow in popularity. In recent years, a significant number of large urban vehicles, such as buses, city trucks and garbage trucks, and a smaller but growing number of trucks and passenger vehicles, have been newly built or converted to natural gas with relative success using off the shelf, high pressure gas storage cylinders and industrial valves.

However, the emergence of compressed natural gas (CNG) as the preferred clean energy fuel for large urban vehicles has more rapidly fueled the interest in CNG. Specifically, this emergence of CNG in the large urban vehicle area has created a need for valves and other fuel system components specifically designed or tailored for the applications. Previously the need for vehicle CNG storage cylinder valves has been satisfied by using various off the shelf valves for different applications, including industrial gas valves; however, this practice that has proven less than ideal, for a number of reasons including the following.

First, these industrial gas valves are usually manufactured from brass forgings. The forging dies that are required to make the brass forging are very expensive to change or modify. For this reason, brass forgings tend to be made and sold on a "one size fits all" basis. The result is that since it is so cost prohibitive to "tailor" these valves to individual vehicle needs, often industrial gas valves that are neither designed nor optimized for compressed natural gas uses are used anyway.

Second, because of the high pressure performance requirements of the natural gas environment, it has always been a requirement that these industrial valves are rather "beefy," i.e., rather heavy and bulky, and as a result require a relatively large "space envelope", i.e., the area in which the valve is positioned. One of the reasons such a large space envelope is required is because sufficient space must be provided in which to rotate a hand wheel with a user's hand wrapped therearound as would be required, when desired, to sufficiently tighten the valve to assure proper and complete shut off. In application, this space envelope is required to be quite large because a large hand wheel is required to supply the necessary torque to allow opening and closing of the standard stainless steel industrial valve at full pressure of often up to 5000 or more psi. Overall, the torque required is quite substantial and thus a large hand wheel is used since the larger hand wheel requires less leverage to supply the necessary torque to open and close the valve. The end result is a large space envelope thereby allowing sufficient room to operate the valve therein. Clearly, this large space envelope reduces space that would otherwise be available for increased gas storage which is extremely desirable for greater vehicle range between fuelings.

Third, a process referred to as "fast fill" has become popular when filling the CNG cylinders, but this process often leads to damaged valves. Basically, "fast fill" is where the shutoff valves on a number of CNG cylinders that are fluidly connected in series are all opened via their inlet and outlet ports such that all of the cylinders simultaneously fill from a large high pressure CNG fueling station. The "fast fill" process is economically attractive and is thus in increased demand because of its rapid ability to fill all of the cylinders in series to the same pressure level.

However, this process has one prevalent downfall in that the relatively high gas velocity of "fast fill" gas streams often breaks free any loosely held metal chips or debris within the fuel lines and moves the particles through the fuel system. Some of this hard metallic debris comes to rest on individual tank shut off valve seats. When the valve seats are closed by receiving the stem, this hard metallic debris is pinned between the stem and seat and often causes the valve to leak because proper seating typically cannot be achieved. Furthermore, the operator often attempts to "overpower" the debris by applying additional torque to the valve hand wheel, which due to its often large size is often capable of supplying extremely high levels of torque that will frequently result in permanent damage to the valve's "close tolerance" metal stem and seat. When permanent damage is done to either the metal stem or seat, this condition usually requires prompt attention in the form of priority replacement of the entire leaking valve—a situation that is both time consuming and expensive, and can be very disruptive to the daily use routine for vehicles in public service such as transit buses or garbage trucks.

Overall, the current designs of shutoff valves being used on CNG cylinders for use with vehicles are not tailored to the specific cylinder and vehicle designs, have oversized hand wheels that decrease gas storage space of the cylinder and provide means for placing damaging levels of torque upon the valve stem against the seat as needed to supply sufficient torque to seat the stem under high pressure conditions, typically require complete removal of the entire valve from the cylinder for repair and/or replacement, and are solely reliant on the stem mechanism to seat the stem to withstand high pressure without leaking.

OBJECTIVES AND SUMMARY OF THE INVENTION

It is an objective of the present invention to provide an improved shutoff valve.

It is further an objective of the present invention to provide an improved shutoff valve for high pressure use such as use in the CNG industry on vehicles such as buses and trucks, or in other pressurized fluid environments such as the scuba diving market.

It is also an objective of the present invention to provide an improved shutoff valve with a removable stem cartridge for easy repair and replacement.

It is another objective of the present invention to provide an improved shutoff valve designed with a lighter weight metal body.

It is a related objective of the present invention to provide an improved shutoff valve designed of a softer, more easily machinable metal body.

It is yet a further objective of the present invention to provide an improved shutoff valve designed with a soft stem tip.

It is a further and related objective of the present invention to provide an improved shutoff valve designed with a nonmetallic stem tip.

It is an even further objective of the present invention to provide a valve body in which the pressurized gas does not act against the stem during seating.

It is yet an even further and related objective of the present invention to provide a valve body with a stem arrangement in which the pressurized gas acts to assist in the stem seating.

It is yet an even further objective of the present invention to provide an improved hand wheel or other valve closure mechanism that is of a significantly smaller overall size so as to fit in a smaller space envelope.

It is yet an even further objective of the present invention to provide an improved hand wheel or other valve closure mechanism that is attached to an improved valve stem that requires significantly less closure torque.

It is yet an even further and a relative objective of the present invention to provide an improved hand wheel or other valve closure mechanism that is attached to an improved valve stem where the combined improved valve stem and closure mechanism is designed such that significantly less closure torque is needed to close the valve stem and therefore a smaller overall sized closure mechanism is needed.

Still other advantages and benefits of the invention will become apparent to those skilled in the art upon a reading and understanding of the following summary and detailed description.

Accordingly, the present invention satisfies these and other objectives as it relates to shutoff valves as used in the pressurized fluid industry on the tanks or cylinders that store such fluid. Specifically, the present invention is a high pressure fluid valve for use with a high pressure compressed fluid storage receptacle having an interior pressurizable chamber therein. The valve includes a valve body and a valve stem. The valve body is fluidly attachable to the receptacle and has an internal port extending into and being in fluid communication with the interior pressurizable chamber of the receptacle, at least one external port for selectively providing at least one of fluid supply and fluid relief, a fluid passage extending between the internal port and the external port, and a shutoff passage intersecting the fluid passage between the internal port and the external port. The valve stem is for insertion into the shutoff passage and is readily and easily removable for replacement or repair without any disassembly or disconnection of the valve body. The valve stem includes a polymer tip for selective closing of the fluid passage between the internal port and the external port.

BRIEF DESCRIPTION OF THE DRAWINGS

Preferred embodiment of the invention, illustrative of the best mode in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENT

Figure 1:
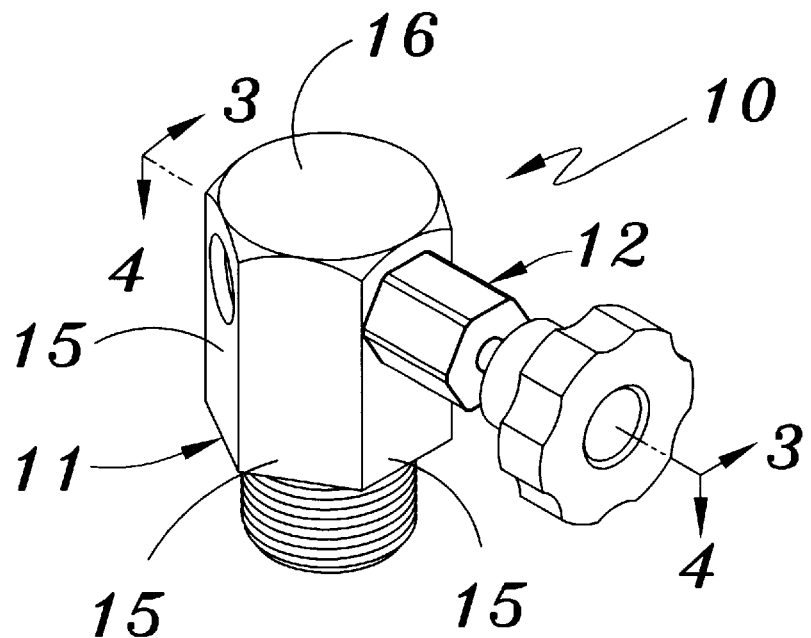
FIG. 1 is a perspective view of a first embodiment of the improved shutoff valve construction with a side valve stem port with a hand wheel actuated removable stem therein.

The improved shutoff valve of the present invention for use with a compressed fluid cylinder, such as a compressed natural gas (CNG) cylinder on a vehicle, is indicated generally in two different embodiments at 10 as is best shown overall in FIGS. 1, 6, and 9, and at 300 as is best shown overall in FIG. 10 where three versions of shutoff valves as described below are shown in these various views of FIGS. 1, 6, and 9–10. In general, the present invention is shown in a first embodiment as shutoff valve 10 in FIGS. 1–9 and in a second embodiment as shutoff valve 310 in FIGS. 10–12.

Figure 6:
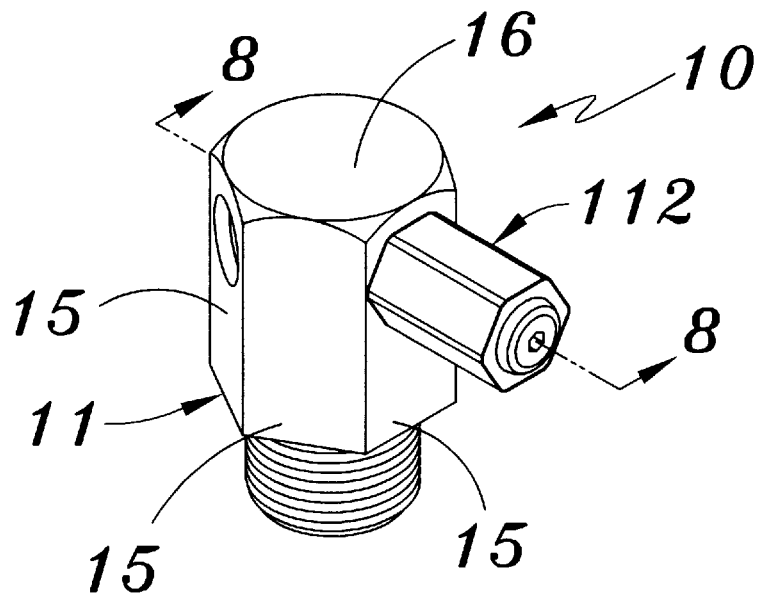
FIG. 6 is a perspective view of the improved shutoff valve construction with a side valve stem port with an "Allen" wrench actuated removable stem therein.
Figure 2:
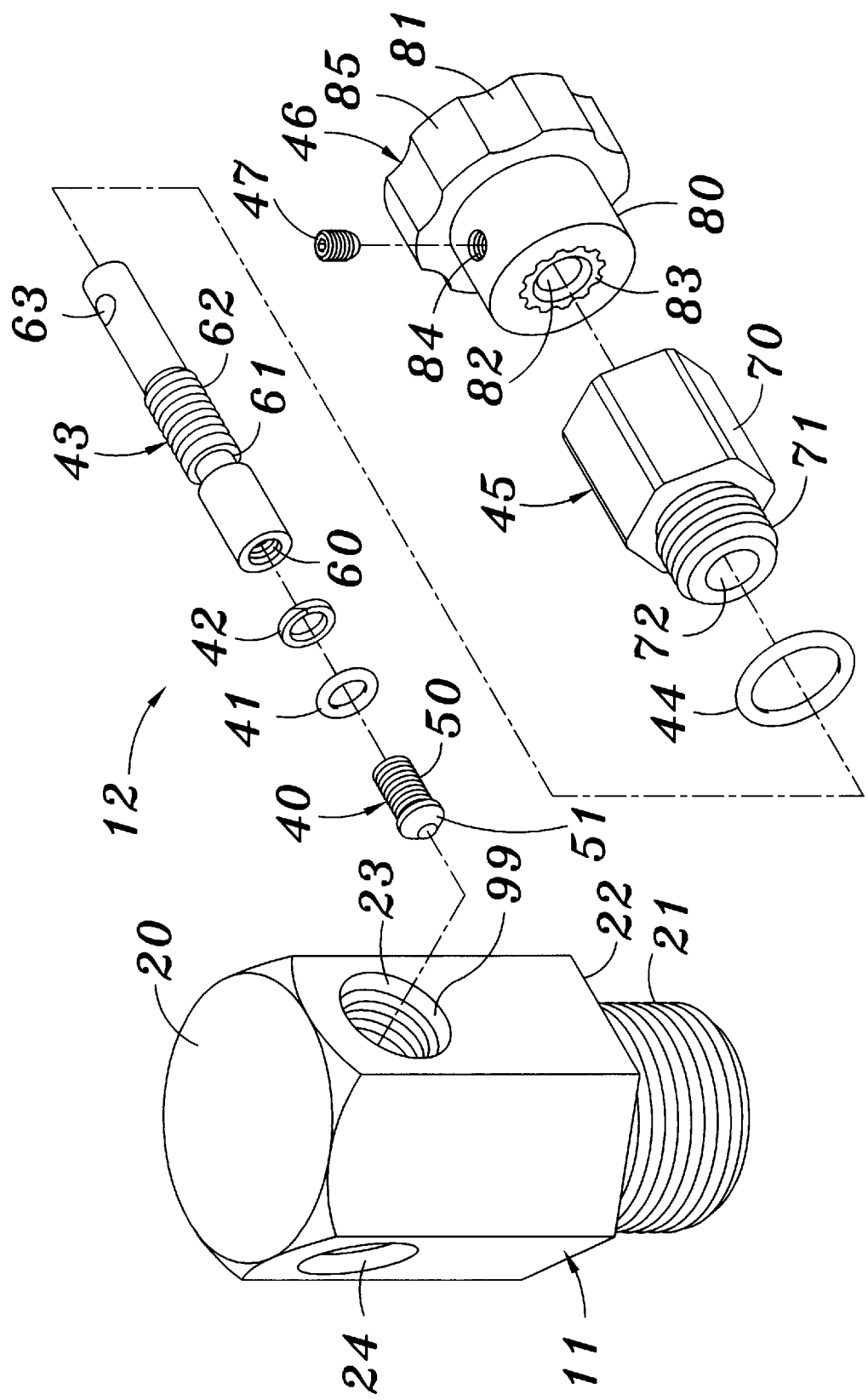
FIG. 2 is an exploded perspective view of the improved shutoff valve of FIG. 1.
Figure 3:
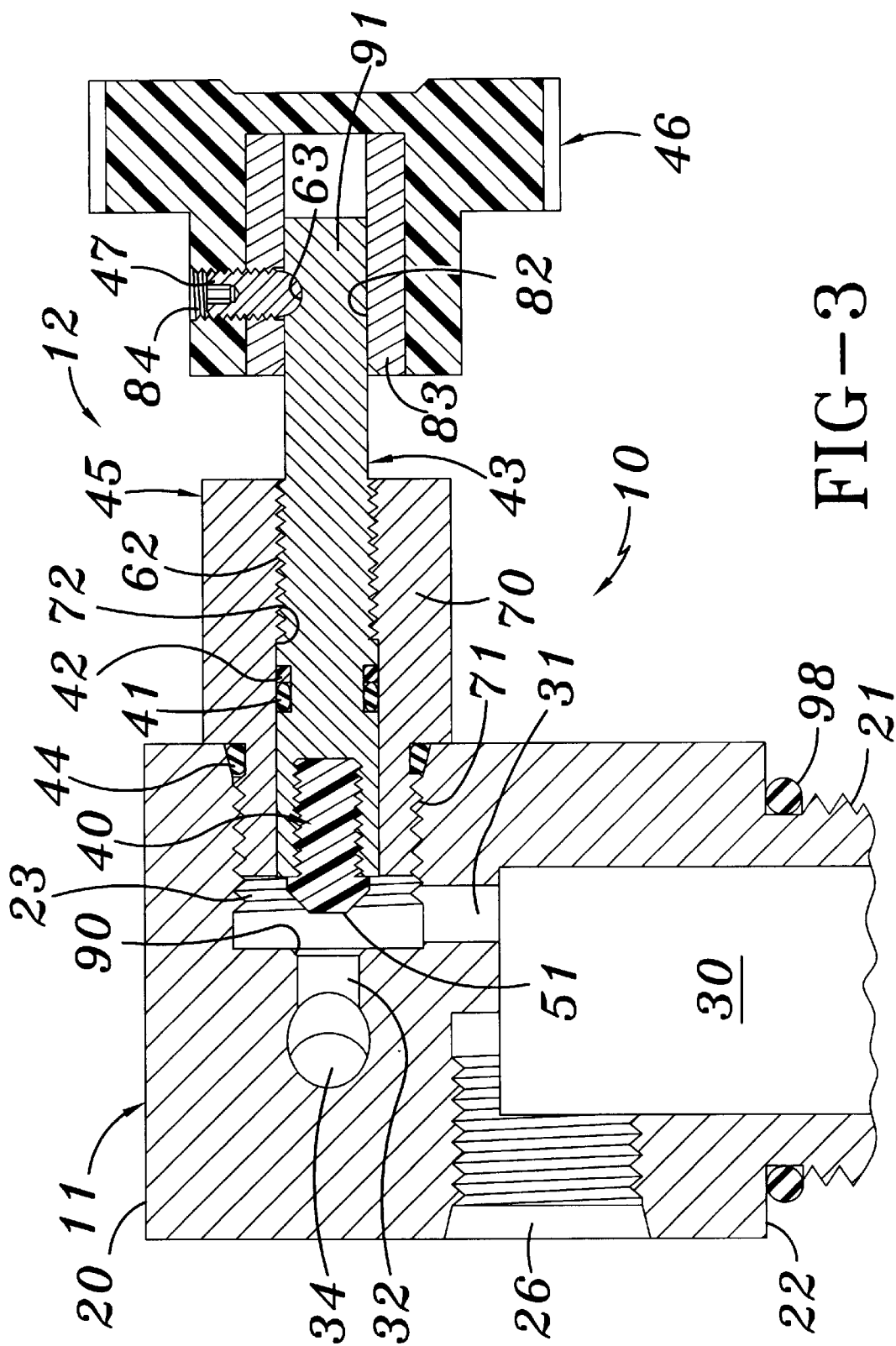
FIG. 3 is a side sectional view taken along line 3—3 in FIG. 2 where the stem is not seated.
Figure 7:
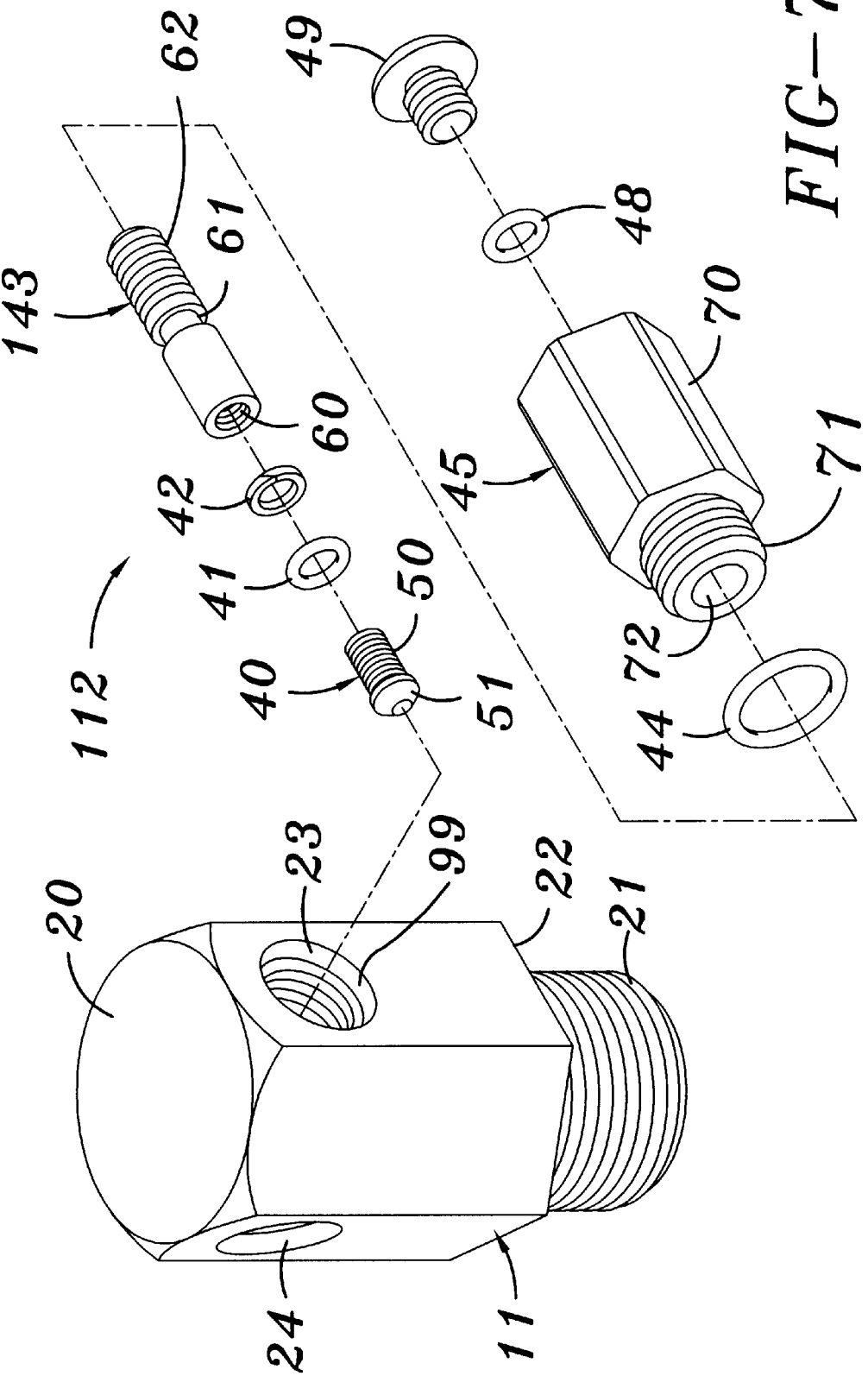
FIG. 7 is an exploded perspective view of the improved shutoff valve of FIG. 6.
Figure 8:
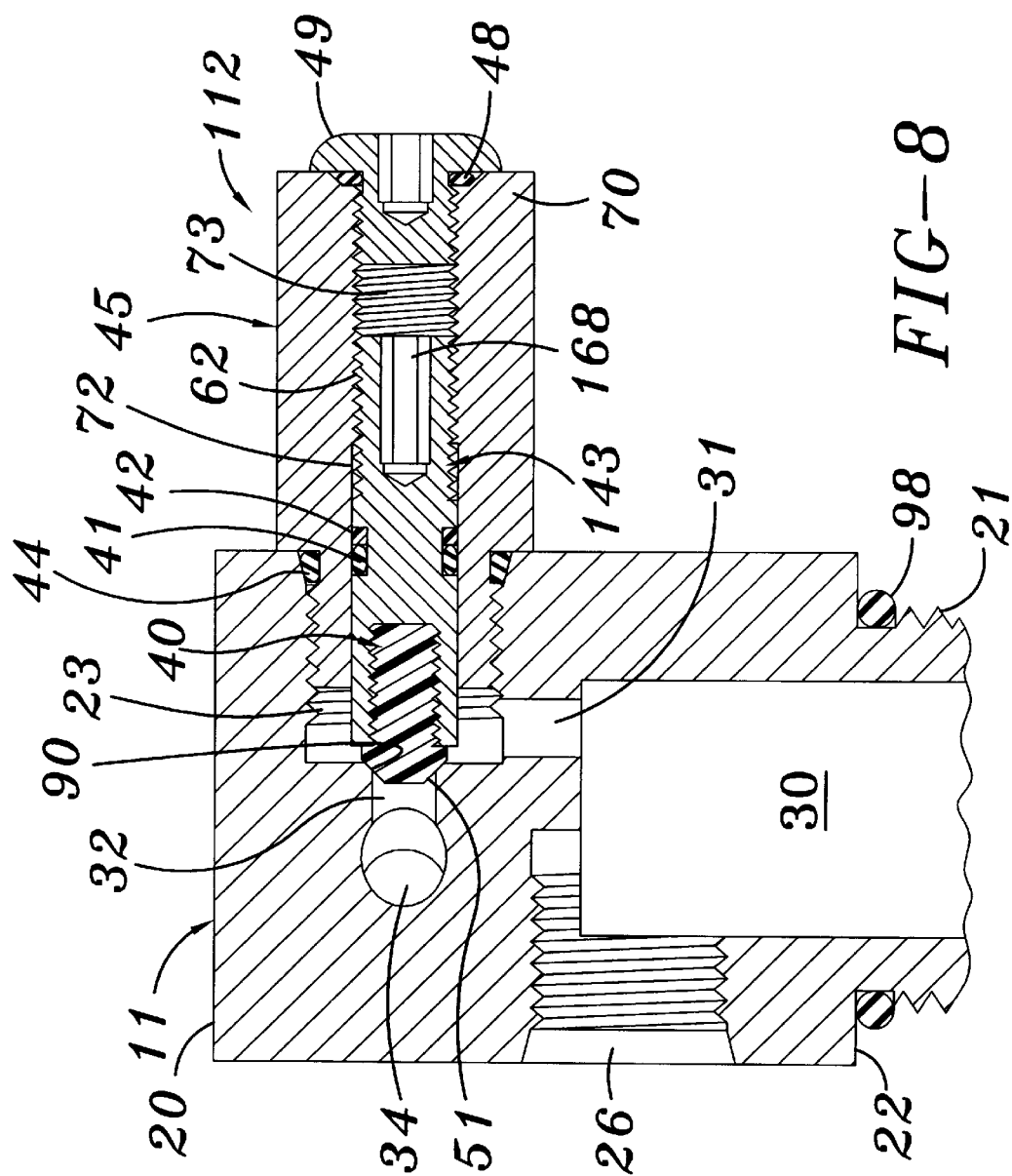
FIG. 8 is a top sectional view taken along line 8—8 in FIG. 6 where the stem is seated.
Figure 9:
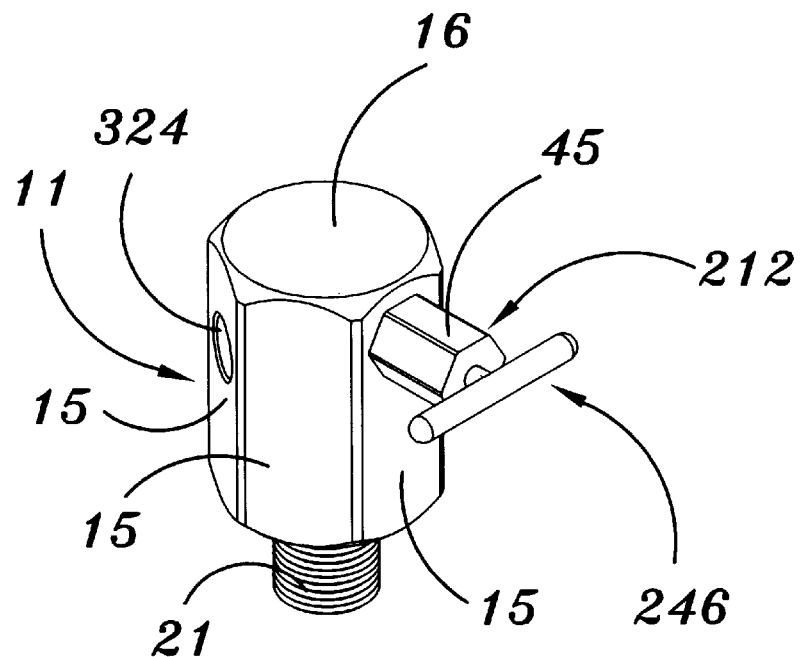
FIG. 9 is a perspective view of the improved shutoff valve construction with a side valve stem port with a "T" handle removable stem therein.

Specifically, a first embodiment of the shutoff valve of the present invention is shown as shutoff valve 10 in FIGS. 1–9 with three variations, namely three different types of valve stems. Shutoff valve 10 as shown in FIGS. 1–5 includes a valve body 11 and a valve stem 12 of a first type. Shutoff valve 110 as shown in FIGS. 6–8 includes the valve body 11 and a valve stem 112 of a second type. Shutoff valve 210 as shown in FIG. 9 includes the valve body 11 and a valve stem 212 of a third type.

Figure 10:
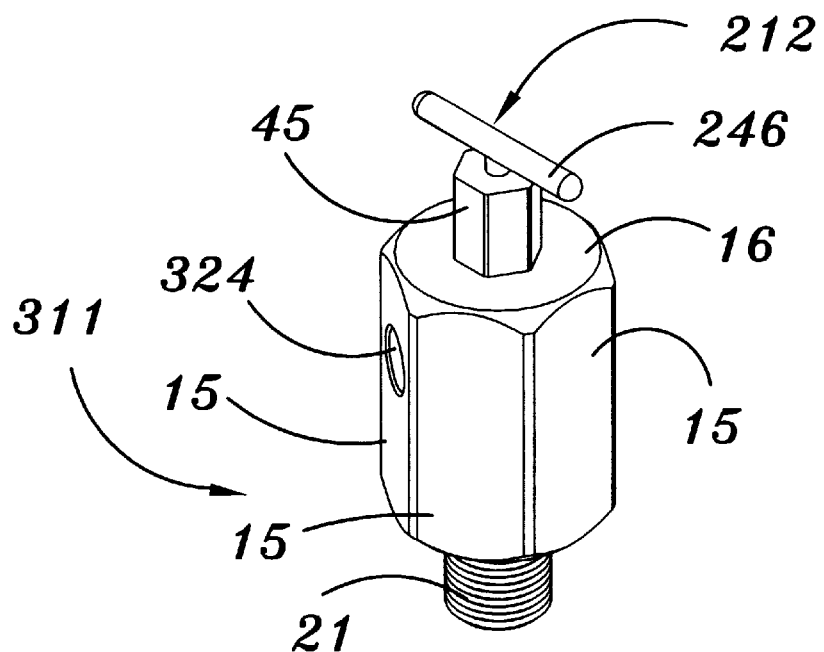
FIG. 10 is a perspective view of a second embodiment of the improved shutoff valve construction with an end valve stem port with the "T" handle removable stem therein.
Figure 11:
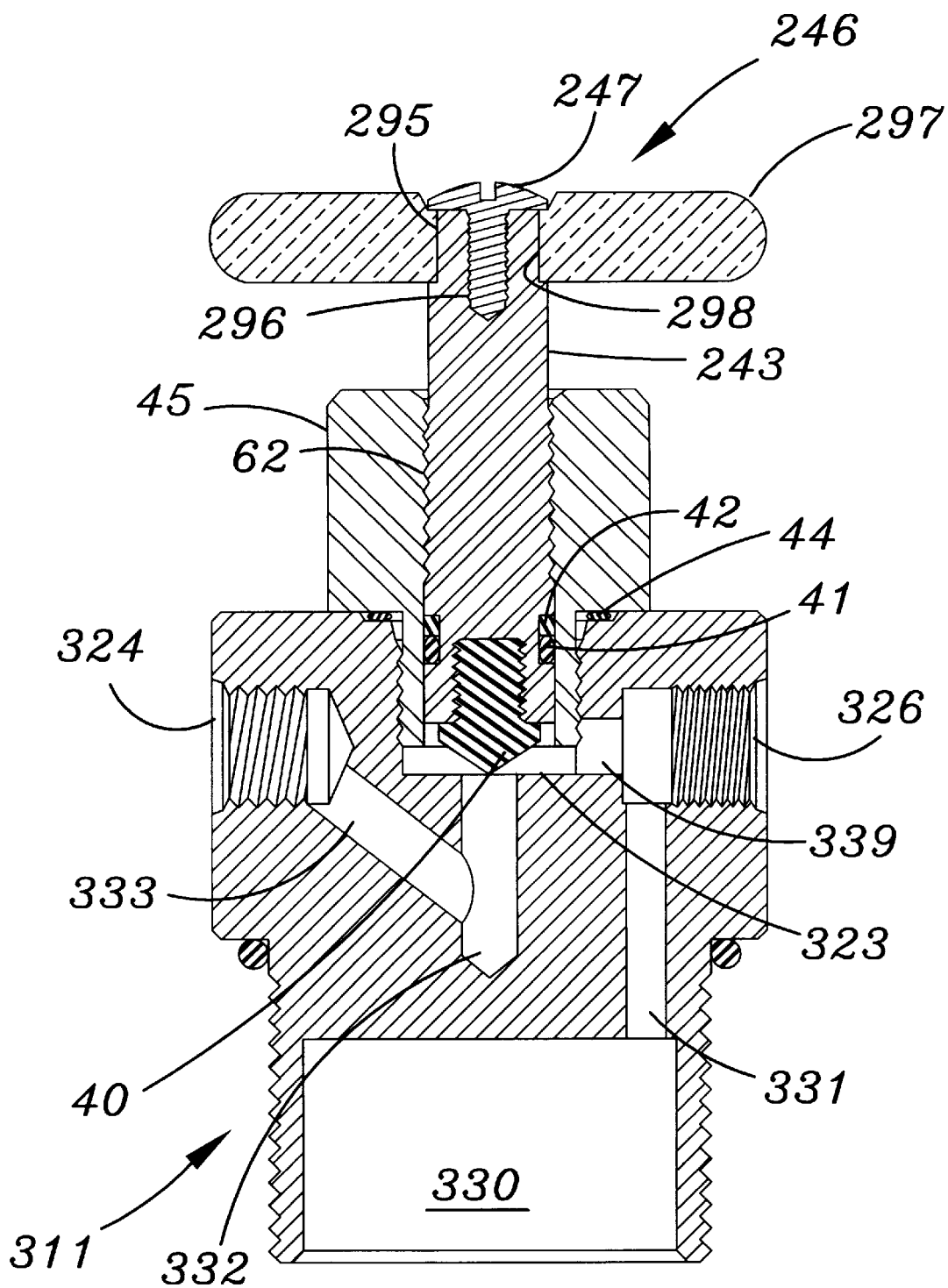
FIG. 11 is a side sectional view taken along line 11—11 in FIG. 10 where the stem is not seated.
Figure 12:
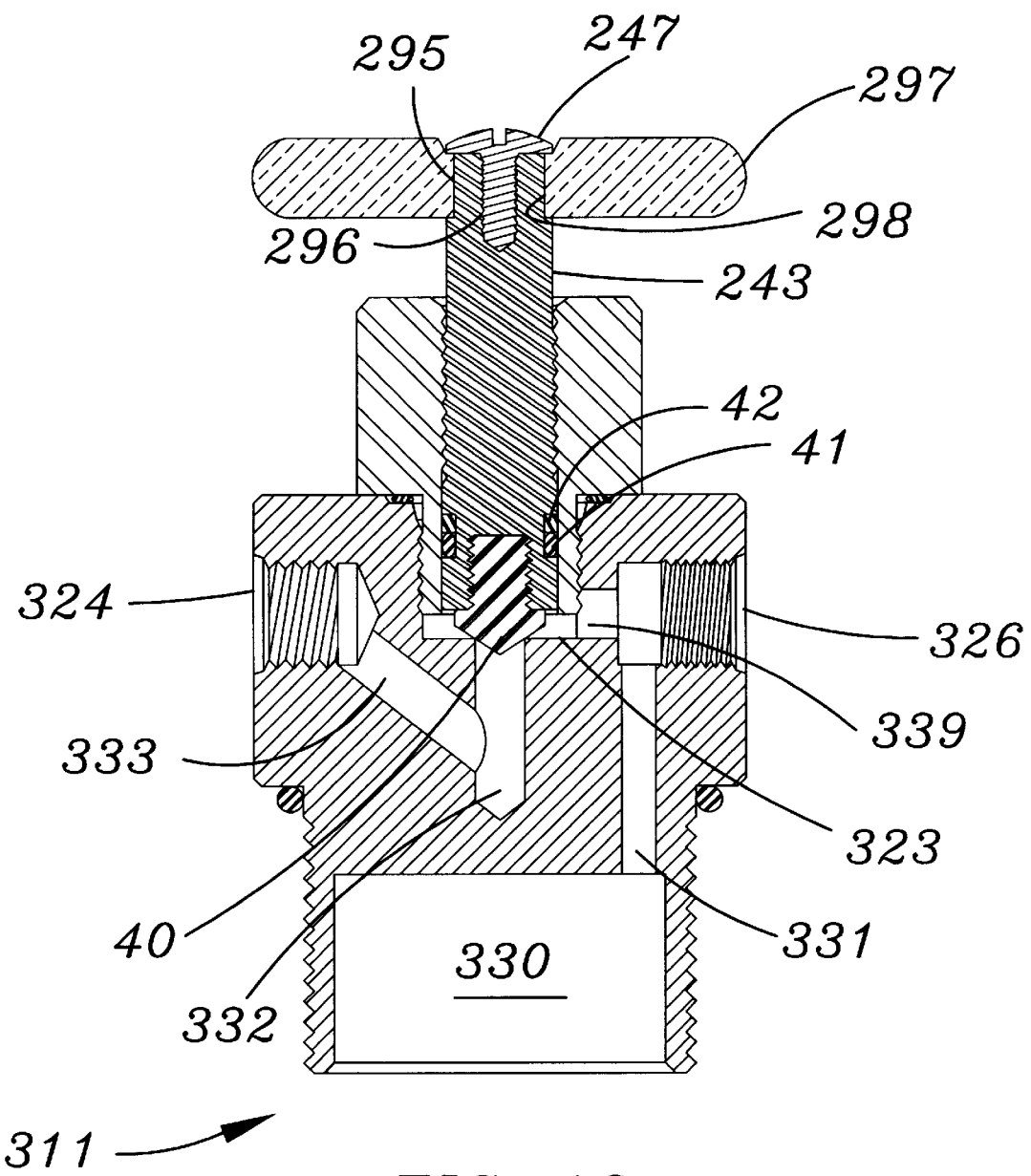
FIG. 12 is a side sectional view taken along line 11—11 in FIG. 10 where the stem is seated.

A second embodiment of the shutoff valve of the present invention is shown as shown as shutoff valve 310 in FIGS. 10–12. Shutoff valve 310 includes a valve body 311 and a valve stem of any of the three types, namely type 1 as in valve stem 12 shown in FIGS. 1–5, type two as in valve stem 112 shown in FIGS. 6–8, or type three shown as in valve stem 212 as shown in FIGS. 10–12. The valve stem 212 as is shown as the valve stem on shutoff valve 310 is the same stem as shown on valve 210 in FIG. 9 as it is the valve body that differentiates shutoff valves 210 and 310.

Valve body 11 is common to the valve versions shown in FIGS. 1–9. This valve body 11 is generally a housing 20 having a threaded nipple 21 extending therefrom whereby a flange or stop 22 is defined where nipple 21 extends from housing 20 as is shown in FIGS. 1–9. The housing 20 includes a plurality of side surfaces 15 (six in the embodiment shown although any other number is contemplated), an outer end surface 16, and an inner end surface which is in effect the flange 22 with the nipple 21 extending therefrom. Housing 20 includes a plurality of ports all extending into separate sides 15 of the valve body, the ports including a valve stem port 23 (shown in FIGS. 2–5 and 7–8), a first fill and/or outlet port 24 (commonly referred to as an inlet/outlet port and shown in FIGS. 1–2, 4–7 and 9), a second fill and/or outlet port 25 (shown in FIGS. 4–5), and a safety port 26 (shown in FIGS. 3 and 8) all of which include threaded interior surfaces. The safety port, also referred to as a thermal port, is optional since certain use parameters may not require such a thermal relief or other safety device, These ports 23–26 are in selective fluid communication with one another through fluid passageways best shown in FIGS. 3–5 and 8. These fluid passageways include a large central bore 30 (FIGS. 3 and 8), a small bore extension 31 (FIGS. 3–4 and 8), a valve stem port extension 32 (FIGS. 3–5 and 8), a first fill port extension 33 (FIGS. 4–5), and a second fill port extension 34 (FIGS. 3–5 and 8) where each extension is of a lesser diameter than the bore or port it extends from or to, thereby defining a limit within that bore or port as to insertion of any valve stem, threaded coupler or other mechanism engageably inserted within the bore or port.

Attached to the valve body 11 is a valve stem which in FIGS. 1–5 is a first type of valve stem 12. This valve stem 12 is shown in the most detail in FIG. 2 to include a tip 40, a small o-ring 41, a spacer 42, a stem 43, a large o-ring 44, a stem retainer 45, a hand wheel 46, and a set screw 47.

Tip 40 and stem 43 are either one piece with tip 40 affixed or bonded to the end of stem 43, or as shown in the Figures and preferred, tip 40 is threadably attached to stem 43. Specifically, tip 40 includes a threaded section 50 terminating in a beveled or sloped nose or head 51. Stem 43 includes a threaded bore 60 in one end of stem 43 for receiving tip 40. Stem 43 further includes a seal housing groove 61, a threaded region 62, and a radial bore 63.

Stem retainer 45 includes a housing 70 having a threaded nipple 71 extending therefrom. Stem retainer 45 also includes through-bore 72 extending axially through the entire stem retainer and including a threaded region 73 therein.

Hand wheel 46 includes a neck or shaft 80 with a head 81 extending radially and axially outward therefrom. Shaft 80 includes a stem receiving bore 82 reinforced about its periphery by a metal sleeve or ring 83. A threaded radial bore 84 intersects the bore 82 and selectively receives set screw 47. Head 81 includes a plurality of grooves spaced about its periphery 85 or, in the alternative, a ribbed or otherwise roughened or ridged surface about its periphery 85.

A second type of valve stem 112 is interchangeable with type one as shown at 12 in FIGS. 1–5. The valve stem 112 is shown in FIGS. 6–8 and in the most detail in FIG. 7, where the valve stem 112 is similar to the valve stem 12 except that hand wheel 46 is replaced by a more space efficient Allen wrench pocket. Specifically, valve stem 112 includes tip 40, small o-ring 41, spacer 42, a stem 143, large o-ring 44, and stem retainer 45, whereby stem 43, hand wheel 46 and set screw 47 are replaced by modified stem 143. This valve stem 112 also includes a supplemental seal 48 and cap 49.

Stem 143 includes threaded bore 60 in one end of stem 143 for receiving tip 40. Stem 143 further includes seal housing groove 61 and threaded region 62. Seal housing groove 61 receives small o-ring 41 and spacer 42. Stem 143 further includes an Allen wrench notch 168 axially extending into the opposite end of the stem as threaded bore 60. This Allen wrench notch is designed of sufficient depth and cross sectional dimension to receive a standard Allen wrench such as a ⅛ inch six sided Allen wrench.

A third type of valve stem 212 is interchangeable with the type one as shown as 12 in FIGS. 1–5 and the type two as shown at 112 in FIGS. 6–8. The valve stem 212 is shown in FIGS. 9–12 attached to one of the valve body 11 or 311. (In the case of all three valve stem types 12, 112, and 212, each is attachable to either of the valve bodies 11 or 311). The valve stem 212 as best shown in section in FIGS. 11 and 12 is similar to valve stems 12 and 112 except that hand wheel 46 and Allen wrench notch 168 are replaced by a "T" handle as described in more detail below.

Valve stem 212 includes tip 40, small o-ring 41, spacer 42, a stem 243, large o-ring 44, a stem retainer 45, a "T" handle 246, and a fastener 247. Stem 243 includes a threaded bore 60 in one end if stem 243 for receiving tip 40. Stem 243 further includes seal housing groove 61 and threaded region 62. Stem 243 also includes a thinned, tapered, or otherwise reduced diameter end 295 with a hole 296 therein for receiving the "T" handle 246 thereon as best shown in FIGS. 11–12.

"T" handle 246 is an elongated rod 297 with a hole 298 therein about approximately its center point. The "T" handle 246 is insertable over reduced diameter end 295 whereby the fastener 247 threadably or otherwise secures the "T" handle to the stem 43 in FIGS. 9–12.

A second embodiment of the valve body is disclosed in FIGS. 10–12 where the valve stem port 23 is in the end of the valve body rather than the side of the valve body as in the first embodiment (FIGS. 1–9). The valve body of this second embodiment is shown as 311 in FIGS. 10–12. This valve body 311 is generally housing 20 having threaded nipple 21 extending therefrom whereby flange or stop 22 is defined where nipple 21 extends from housing 20 as is shown in FIGS. 10–12. The housing 20 includes a plurality of side surfaces 15 (six in the embodiment shown although any other number is contemplated), an outer end surface 16, and an inner end surface which is in effect the flange 22 with the nipple 21 extending therefrom. Housing 20 includes a plurality of ports including a valve stem port 323 (extending into outer end surface 16), at least one fill and/or outlet port 324 (extending into one of the sides 15), and a safety port 326 (extending into another of the sides 15) all of which include threaded interior surfaces. These ports 323–326 are in selective fluid communication with one another through fluid passageways best shown in FIGS. 11–12. These fluid passageways include a large central bore 330, a small bore extension 331, a safety port extension 339, a valve stem port extension 332, and a fill port extension 333 where each extension is of a lesser diameter than the bore or port it extends from or to, thereby defining a limit within that bore or port as to insertion of any valve stem, threaded coupler or other mechanism engageably inserted within the bore or port.

In construction of the best mode, the valve body 11 or 311 is a metal housing cast or machined from aluminum, alloys, or a similar lightweight metals, although heavier metals such as stainless steel would also suffice but add cost and defeat two of the benefits of the soft tip in that lighter materials can be used for valve body construction to reduce valve weight and allow for easier machining, both of which reduce cost. Housing 20 is cast, machined or otherwise manufactured to include a threaded nipple 21 terminating in a flange or stop 22 thereby providing a surface against which the housing is tightly fastened to a CNG cylinder (not shown). Housing 20 further is cast, machined or otherwise manufactured to include the plurality of ports including valve stem port 23 or 323, first fill port 24 or 324, second fill port 25 if necessary, and safety port 26 or 326, and the passageways connecting these ports together.

Specifically, valve body 11 as shown in FIGS. 1–9 includes the plurality of ports and fluid passageways all of which branch off from the central bore 30 or extension 31 extending therefrom. Specifically, large central bore 30 extends inward into the valve body from threaded nipple 21 and defines an elongated axis of the valve. Ports 23–26 radially extend outward from central bore 30, or from extension 31. Safety port 26 is a threaded port that radially extends into and intersects the large central bore 30 at approximately adjacent to or slightly indented into the base of the bore. Small bore extension 31 extends in an offset yet axial manner from the base of the bore further into the valve body whereby the extension 31 intersects with valve stem port 23 at approximately its base where port 23 radially extends into the valve body. First fill port extension 33 and second fill port extension 34 each extend approximately radially further into the valve body from an offset position in the base of the first fill port 24 and second fill port 25, respectively, until the fill extensions 33 and 34 intersect. Similarly yet centrally, valve stem bore extension 32 extends from the base of the radial valve stem port 23 at its intersection with the small bore extension 31 radially into the valve body to a common intersection with the fill extensions 33 and 34.

Specifically as to the other valve body construction, valve body 311 as shown in FIGS. 10–12 includes the plurality of ports and fluid passageways all of which branch off from the central bore 330 and extension 331 extending therefrom. Specifically, large central bore 330 extends inward into the valve body from threaded nipple 21 and defines an elongated axis of the valve. Safety port 326 is a threaded port that radially extends into the valve body where small bore extension 331 intersects it approximate its base. This small bore extension 331 extends in an offset yet axial manner from the base of the bore 330 further into the valve body whereby it intersects with safety port 326. The base of safety port 326 includes the safety port extension 339 which radially extends inward from safety port 326 to valve stem port 323 at approximately its base where port 323 axially extends into the valve body from an outer end surface 16 of the valve. The valve stem port extension 332 axially extends into the valve body until it intersects with fill port extension 333 which itself extends diagonally into the valve body from the base of the fill port 324

The stems (43, 143, 243) and stem retainer 45 are constructed of either lightweight metals such as aluminum, or alternatively heavier metals such as stainless steel, which in either case is cast or machined to include the various threads, notches, grooves, bores, ports, etc. The hand wheel 46 and "T" handle 246 may be manufactured from either metals or molded of polymers. (The hand wheel when molded from any known polymer must be capable of supplying sufficient rigidity to allow for normal tightening and untightening forces). As to some of the other parts, such as the spacer, set screws, fasteners, cap, etc., these are manufactured of any metal, polymer, or other substance as is well known in the art. The seals and o-rings are of any suitable material such as elastomers.

The stem nose or tip is typically manufactured from polymers and is therefor either molded or machined (machining may be performed from rod stock). The stem nose or tip is manufactured from hard engineering polymers which (1) are softer than the contacting metal seat, and (2) have highly reliable sealing characteristics in repetitive sealing operations with soft metallic seats such as aluminum. One such hard engineering polymer is polyetheretherketone, which is commonly referred to as PEEK. Other such hard engineering polymers include polysulfone, and polyetheramide which is marketed under the trademark ULTEM.

In assembly, a natural gas conduit is sealably threaded to each of the fill ports 24 and 25, or 324 to withstand substantial pressure without leakage using technology well known in the art. These ports are internally interconnected by fill extensions 33 and 34 (or in the case of valve body 311 when designed for fast fill and thus with two fill ports, extension 333 and another extension not shown) which are oversized in diameter to allow for "fast" fill. In application, a plurality of adjacent cylinders each interconnected by conduit and having its own valve can be fast filled together as a surge of pressurized natural gas can be released into one conduit whereby a substantially instantaneous equilibrium pressure will be reached with natural gas passing along the numerous conduits in series through the fill ports of each valve. When one or more of the valves is opened, equilibrium pressure will also be reached within all of the cylinders connected to the open valves in a quick manner due to the large fill ports.

A safety valve of any type is threaded in the safety port 26 or 326 to withstand the substantial normal pressure of the system although the safety valve is designed to rapidly release the contents of that particular cylinder when certain unsafe conditions such as high temperature are met. Numerous safety valves are well known in the art including the temperature/pressure relief valves disclosed in U.S. Pat. Nos. 5,161,738; 5,197,671; and 5,213,128 all of which are hereby incorporated by reference.

Stem 43, 143, or 243 must be assembled so that it can be threaded into valve stem port 23 or 323; and in addition, valve body 11 or 311 must also be affixed to a cylinder. Assembly of stem 43, 143 or 243 and connection of valve body 11 or 311 involves in no particular order, the following unrelated steps. As to valve body 11 or 311, threaded nipple 21 or 321 is fastened and sealed to the cylinder within a hole therein by means well known in the art typically using an o-ring seal 98. As to stem 43, 143 or 243, the positioning of small o-ring 41 and spacer 42 into seal housing groove 61 is achieved by forcibly sliding these seals over the stem whereby these seals prevent gas passage through throughbore 72 between the stem 43, 143, or 243 and stem retainer 45, respectively, when the stem is inserted within the stem retainer. The threaded section 50 of tip 40 is threaded into the threaded bore 60 in one end of stem 43, 143, or 243.

Figure 4:
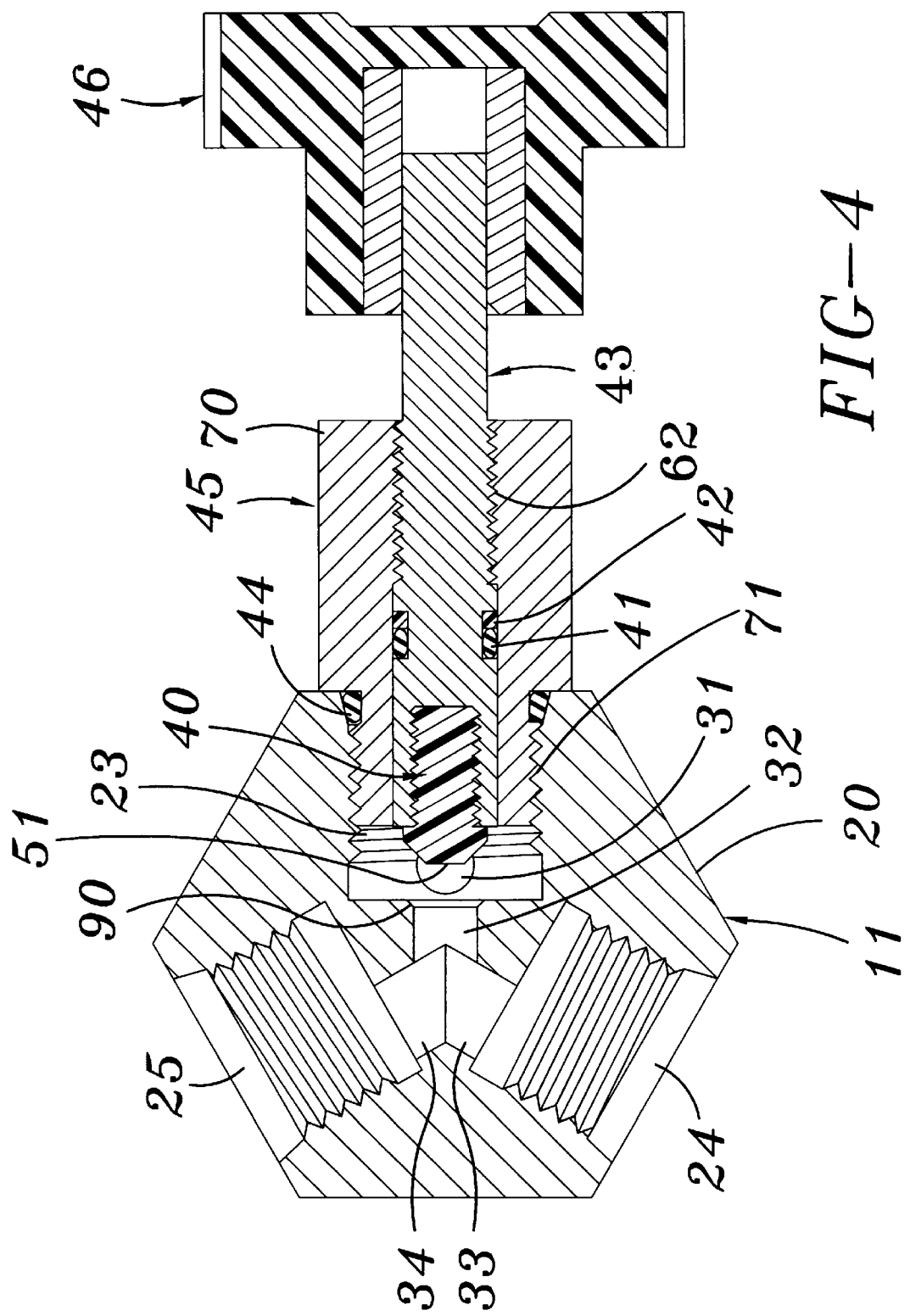
FIG. 4 is a top sectional view taken along line 4—4 in FIG. 2 where the stem is not seated.
Figure 5:
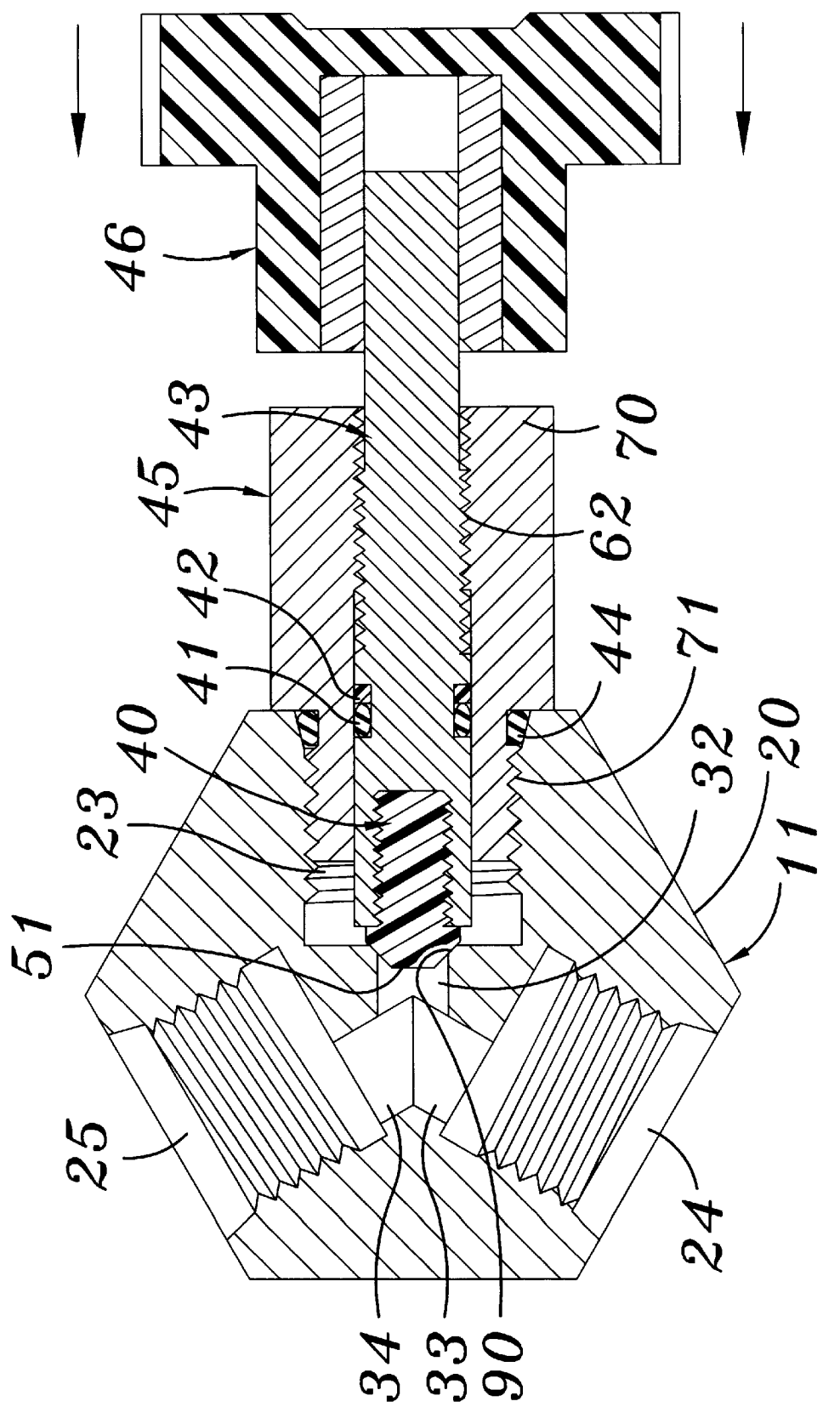
FIG. 5 is a top sectional view taken along line 4—4 in FIG. 2 where the stem is seated.

After completion of both of these assembly steps, the stem 43,143 or 243 is inserted into the stem retainer 45, respectively whereby the threaded region 62 of the stem engages the threaded region 73 within the through-bore 72 of the stem retainer. This can only be done by inserting stem 43, 143 or 243 into the unthreaded end (large diameter port of through-bore) and threading the stem completely through such that head 51 extends out the threaded end. This installation method is required because the unthreaded end of the stem with bore 60 therein is of a larger outer diameter and will not fit through the threaded portion of bore 72 (this is such that (1) any pressure on the stem is dissipated into the stem retainer when the stem is completely removed from seating as shown in FIGS. 4 or 11 as well as (2) prohibiting the opening of the hand wheel too far whereby the stem otherwise could be removed.) In general then, the stem is positioned for extension from and retraction into the through-bore as needed for seating of the beveled head 51 into valve stem bore extension 32, 132, or 232 and in the preferred embodiment a beveled seat 90 circumferentially surrounding the extension 32, 132, or 232, respectively.

In the case of stem 43, an additional step is needed where the hand wheel 46 is fastened to the extra length 91 of stem by setting set screw 47 within threaded bore 60 and into radial bore 84 after this extra length 91 of stem in stem 43 extends completely through through-bore 72 and seats within stem receiving bore 82. The stem is now ready for installation within the valve body.

Stem 43, 143 or 243 is thread into the valve stem port 23, 123, or 223 with a large o-ring 44 forming a compression seal between the flange 22 and either the outer surface of the housing 20 adjacent and circumferentially around the port 23, 123, or 223 or along a beveled annular entrance surface 99.

The valve is now adjustable such that the stem 43, 143, or 243 moves inward and outward so as to selectively engage or disengage with the valve body for sealing and unsealing. This stem motion is caused by either the hand wheel 46, the Allen notch 168, or the "T" handle 246. In the Allen wrench embodiment, after the cylinder is filled and the valve is closed, the supplemental o-ring 48 and cap 49 are threaded into the stem retainer 45 thereby providing an additional seal if the stem seals were to fail.

In operation, the "hard engineering" PEEK tip 40 is softer than the prior art metallic tips and therefore does not damage the metal stem bore extension 32, 132 or 232 and metal beveled seat 90 when the tip is tightened down. This reduces premature failure of the valve. Specifically, in contrast to the industrial gas valves manufactured using brass forged bodies and stainless steel stems, this new "soft seat" valve utilizes a stainless steel (hard metal) or aluminum (soft metal) stem with a "pocketed" hard engineering polymer (PEEK) tip that is relatively soft when compared to standard metal valve seats (but hard in comparison to typical polymers) thereby allowing it to be used with softer metal valve bodies (such as aluminum) with no damage to the valve seating area (even with repeated closings). This makes sealing reliable and significantly reduces valve weight.

This is particularly beneficial where debris as described above is passing through the system based upon a "fast" fill since any debris compressed in between the tip 40 and seat 90 when the stem is closed could potentially damage the tip. Damage to the seat or tip typically results in leakage and failed seating. Furthermore, leakage typically causes the user to overtighten to attempt to compensate for a leak thereby permanently damaging the seat which in prior art designs requires full removal of the entire valve for replacement. In this case, if debris blocks closure of the stem or if the user attempts to overtightens the only part that can be damaged is the PEEK tip 40, and specifically nose 51, which is much softer than the metal body and specifically seat 90. The result is that if such damage does occur, repair is easy because one need merely unthread the stem cartridge (the combination of the stem 43, 143, or 243, the attached stem tip 40, and the stem retainer 45) and replace it.

This PEEK tip 40 further merely requires a low tightening torque to close due to the unique configuration of the passageways in the valve body. The result is large hand wheels are no longer needed and instead a small hand wheel or merely a small Allen wrench is sufficient to sealably close the tip to the seat in the valve body.

This unique configuration creates an inverted seal because the pressure from the tank does not act against the tip, i.e. directly at the end of the tip, as in standard designs but instead acts to engage the tip with the valve body by acting behind the stem. Specifically, the natural gas pressure is via small bore extension 31, 131, or 231 which is against the outer side surface of stem 45, 145 or 245 and therefore behind the tip rather than against the tip 40. The result is the fluid pressure supplements the seal by applying pressure to the stem correlated to the gas pressure which pushes the stem and tip into further contact with the valve body. In essence, the design results in the fluid pressure reinforcing, augmenting, accentuating, or otherwise furthering the seating by providing force behind or adjacent the tip thereby furthering pushing the tip toward its seat rather than in the prior art where the fluid pressure acted against the front surface of the tip thereby working against the tip.

Therefore, when this tip-stem configuration is married with the "inverted" stem/seat design configuration, a situation is created where increased pressure enhances the stem/seat seal, thus generating a condition where additional valve wheel torque is not required to maintain the seal as gas pressure is increased. This situation results in a dramatic increase in "user friendliness" since a stem lightly torqued to seal at 100 psi will continue to seal without additional hand wheel torque all the way up to pressures in the range of 5000 psi without any further tightening due to the increased fluid pressure acting to reinforce the stem seating.

This dramatic reduction in stem seal torque over the operating pressure range of the valve allows for the miniaturization of the stem and hand wheel (knob), or miniaturization of the stem and elimination of the hand wheel (replacing it with an Allen wrench notch or small "T" handle) thereby significantly reducing the size of the valve package. This reduction of the size of the valve package thus allows more available space for cylinder gas volume. The stem sealing torque is in fact reduced so significantly that the valve can be readily opened or closed at 5000 psi with only an ⅛ inch or equivalent Allen wrench. The use of the ⅛ inch Allen wrench as described in the preferred embodiment in lieu of a small turn wheel further reduces the valve "package" size.

In addition, the new "soft seat" valve is intentionally designed with a readily removable "stem cartridge" so that in the event of contamination damage to the "soft" stem tip 40 and specifically the beveled nose 51, the stem can be quickly and efficiently replaced with a new stem. Because the soft stem nose is unlikely to embed any contamination in the harder metal valve seat 90 it is unlikely that the valve body will be damaged, thus avoiding expensive valve replacement.

Accordingly, the improved shutoff valve is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved shutoff valve is constructed and used, the characteristics of the construction, and the advantageous, new and useful results obtained; the new and useful structures, devices, elements, arrangements, parts and combinations, are set forth in the appended claims.

We claim:

1. A removable valve stem for use with a high pressure fluid valve used in conjunction with high pressure compressed fluid storage receptacles, comprising:
    an elongated valve stem cartridge selectively insertable within the high pressure fluid valve, the valve stem cartridge made of metal and comprises a valve stem removably threaded within a stem retainer threadable into the high pressure fluid valve; and
    a polymer tip affixed to the first end wherein the tip being for selective closing of fluid passages within the fluid valve whereby the tip when the valve stem is closed seats within the fluid passage in such a manner that any compressed gas within the fluid passage reinforces the seating of the valve stem cartridge by acting against sides of the tip and thereby the closing of the fluid passage.

2. The removable valve stem as set forth in claim 1 wherein the polymer tip is polyetheretherketone.

3. The removable valve stem as set forth in claim 2 wherein the second end of the valve stem includes a socket for receiving a tool.

4. The removable valve stem as set forth in claim 3 wherein the socket is an Allen wrench socket.

5. The valve stem as set forth in claim 2 further comprising one of a hand wheel and a handle affixed to the second end of the valve stem body.

6. The high pressure fluid valve as set forth in claim 1 wherein the stem retainer with the valve stem and tip therein are removable from the valve body for replacement and repair without disassembly of the valve body, and wherein the valve stem is removable only from an innermost end of the stem retainer that is the end that threads into the valve body.

7. The high pressure fluid valve as set forth in claim 6 wherein the valve stem includes a larger diameter end with the polymer tip therein and a smaller diameter end opposite thereof such that the valve stem is removable only from an innermost end of the stem retainer that is the end that threads into the valve body.

8. A high pressure fluid valve for use with a high pressure compressed fluid storage receptacle having an interior pressurizable chamber therein, comprising:
    a valve body fluidly attachable to the receptacle, the valve body having an internal port extending into and being in fluid communication with the interior pressurizable chamber of the receptacle, at least one external port for selectively providing at least one of fluid supply and fluid relief, a fluid passage extending between the internal port and the external port, and a shutoff passage intersecting the fluid passage between the internal port and the external port; and
    a valve stem for insertion into the shutoff passage wherein the valve stem is threadably adjustable in the stem retainer in the shutoff passage from a first position where the fluid passage is blocked to a second position where the fluid position is open, the valve stem including a polymer tip for selective closing of the fluid passage between the internal port and the external port wherein the polymer tip when the valve stem is closed seats within the fluid passage in such a manner that any compressed gas within the fluid passage reinforces the seating of the valve stem by acting against sides of the polymer tip and thereby the closing of the fluid passage.

9. The high pressure fluid valve as set forth in claim 8 further comprising a stem retainer insertable into the shutoff passage, the stem retainer having a through-bore for housing the valve stem during insertion into the shutoff passage.

10. The high pressure fluid valve as set forth in claim 9 wherein the polymer tip is a hard engineering polymer selected from the group polyetheretherketone, polysulfone, and polyetheramide.

11. The high pressure fluid valve as set forth in claim 4 wherein the valve stem further includes one of the group of a hand wheel, an Allen wrench socket, and a "T" handle for selective threadably adjustment of the stem within the shutoff passage.

12. The high pressure fluid valve as set forth in claim 9 wherein the stem retainer with the valve stem and tip therein are removable from the valve body for replacement and repair without disassembly of the valve body.

13. The high pressure fluid valve as set forth in claim 12 wherein the valve stem is removable only from an innermost end of the stem retainer that is the end that threads into the valve body.

14. The high pressure fluid valve as set forth in claim 13 wherein the valve stem includes a larger diameter end with the polymer tip therein and a smaller diameter end opposite thereof such that the valve stem is removable only from an innermost end of the stem retainer that is the end that threads into the valve body.

15. The high pressure fluid valve as set forth in claim 8 wherein the valve stem is seatable within the valve body in an inverted manner such that any compressed gas within the fluid passage when the valve stem is closed reinforces the seating of the valve stem and thereby the closing of the fluid passage.

16. The high pressure fluid valve as set forth in claim 8 wherein the valve stem when mechanically closed engages a valve seat within the fluid passage such that any compressed gas within the interior of the receptacle acts to bolster the mechanical closure of the valve stem within the seat.

17. The high pressure fluid valve as set forth in claim 8 wherein the shutoff passage is a valve stem port having a side wall terminating in a base, the base having a valve stem extension extending therefrom, the valve stem extension being of a smaller diameter than the valve stem port thereby defining a valve seat against which the valve stem is closed when the gas passage from the internal port to the external port is closed.

18. The high pressure fluid valve as set forth in claim 1 wherein the external port is fluidly connected to valve stem extension, and wherein the internal port is fluidly connected to the valve stem port.

19. The high pressure fluid valve as set forth in claim 18 wherein the internal port is a central bore extending into the valve body and defining a central axis, the central bore having a bore side wall terminating within the valve body as an inlet base, a reduced diameter bore extension further extends into the valve body from the inlet base until intersection with a safety port that radially extends inward into the valve body, and wherein the safety port includes a safety port side wall terminating in a safety base with a reduced diameter safety extension further extending into the valve body until intersection with the valve stem port.

20. The high pressure fluid valve as set forth in claim 18 wherein the internal port is a central bore extending into the valve body and defining a central axis, the central bore having a bore side wall terminating within the valve body as an inlet base, a reduced diameter bore extension further extends into the valve body from the inlet base until intersection with the valve stem port.

21. The high pressure fluid valve as set forth in claim 20 wherein a safety port radially extends inward into the valve body and fluidly communicates with the central bore.

22. The high pressure fluid valve as set forth in claim 8 wherein the valve stem further includes a stem body to which the polymer tip is interchangeably affixed.

23. A high pressure fluid valve for use with a high pressure compressed fluid storage receptacle, comprising:
 a valve body fluidly attachable to the receptacle, the valve body having an internal port extending into and being in fluid communication with the interior pressurizable chamber of the receptacle, at least one external port for selectively providing at least one of fluid supply and fluid relief, a fluid passage extending between the internal port and the external port, and a valve stem port intersecting the fluid passage between the internal port and the external port; and
 a removable valve cartridge removably threaded into the valve stem port, the valve cartridge including a valve stem for selective closing of the fluid passage between the internal port and the external port wherein the valve stem is threadably from a first position where the fluid passage is blocked to a second position where the fluid position is open, the valve stem including an end tip for selective closing of the fluid passage between the internal port and the external port wherein the end tip when the valve stem is closed seats within the fluid passage in such a manner that any compressed gas within the fluid passage reinforces the seating of the valve stem by acting against sides of the end tip and thereby the closing of the fluid passage.

24. The high pressure fluid valve as set forth in claim 23 wherein the valve stem further comprises the end tip for selective closing of the fluid passage, the tip being made of a first material different from the second material that the valve body, valve cartridge and valve stem are made of.

25. The high pressure fluid valve as set forth in claim 24 wherein the first material is softer than the second material.

26. The high pressure fluid valve as set forth in claim 25 wherein the first material is a polymer and the second material is a metal.

27. The high pressure fluid valve as set forth in claim 26 wherein the metal is selected from the group consisting of aluminum, steel, stainless steel, brass, copper, and any alloys thereof, and the polymer is is selected from the group polyetheretherketone, polysulfone, and polyetheramide.

28. The high pressure fluid valve as set forth in claim 23 wherein the valve stem port includes a side wall terminating in a base having a valve stem extension therein of a smaller diameter than the valve stem port whereby the valve stem is seatable within a mouth of the valve stem extension at the valve stem port.

29. The high pressure fluid valve as set forth in claim 28 wherein the at least one external port includes a pair of inlet/outlet ports in fluid communication with the valve stem extension.

30. The high pressure fluid valve as set forth in claim 23 wherein the valve cartridge further includes a stem retainer with a through bore therein for receiving the valve stem, the stem retainer is threaded within the valve stem port and the valve stem is threadably adjustable in the through bore in the stem retainer from a first position where the fluid passage is blocked to a second position where the fluid position is open, and wherein the valve stem when closed seats within the fluid passage in such a manner that any compressed gas within the fluid passage reinforces the seating of the valve stem and thereby the closing of the fluid passage.

31. The high pressure fluid valve as set forth in claim 30 wherein the stem retainer with the valve stem and tip therein are removable from the valve body for replacement and repair without disassembly of the valve body.

32. The high pressure fluid valve as set forth in claim 31 wherein the valve stem is removable only from an innermost end of the stem retainer that is the end that threads into the valve body.

33. The high pressure fluid valve as set forth in claim 32 wherein the valve stem includes a larger diameter end with the polymer tip therein and a smaller diameter end opposite thereof such that the valve stem is removable only from an innermost end of the stem retainer that is the end that threads into the valve body.

34. The high pressure fluid valve as set forth in claim 23 wherein the valve stem further includes one of the group of a hand wheel, an Allen wrench socket, and a "T" handle for selective threadably adjustment of the stem within the valve stem port.

* * * * *